A. NOWAKOWSKI.
SPITTOON.
APPLICATION FILED MAR. 23, 1917.
1,245,013. Patented Oct. 30, 1917.
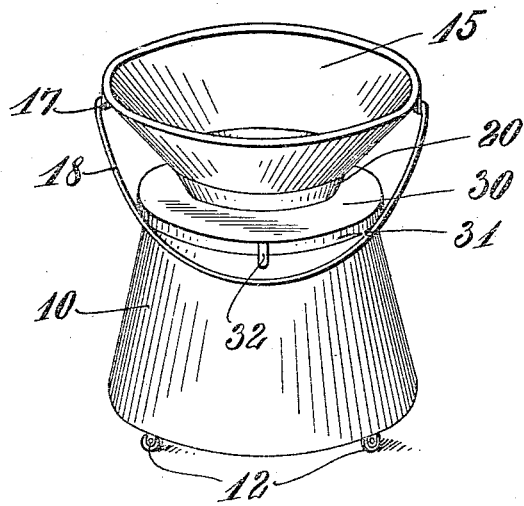
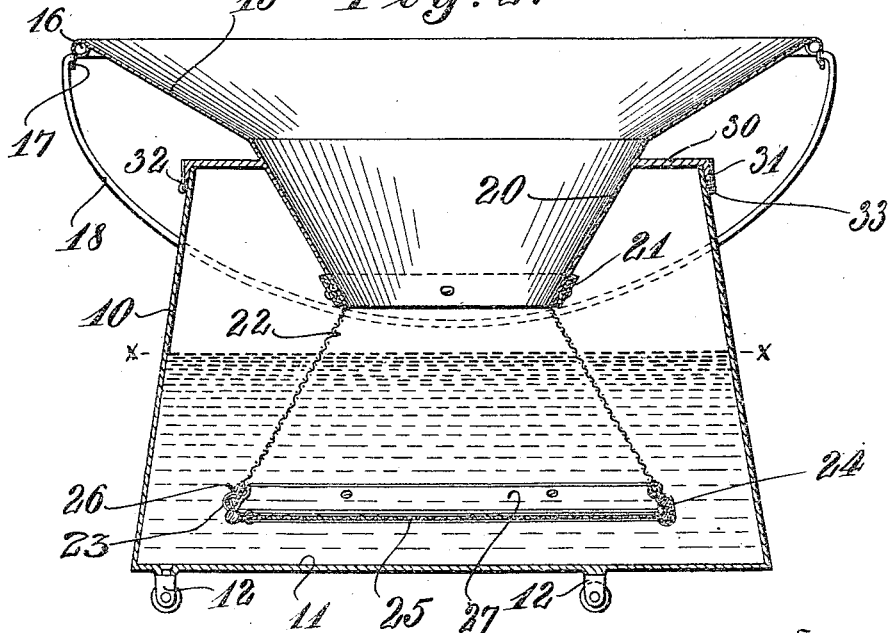
Inventor
Aleksander Nowakowski.
By his Attorney

UNITED STATES PATENT OFFICE.

ALEKSANDER NOWAKOWSKI, OF DETROIT, MICHIGAN.

SPITTOON.

1,245,013. Specification of Letters Patent. Patented Oct. 30, 1917.

Application filed March 23, 1917. Serial No. 156,833.

*To all whom it may concern:*

Be it known that I, ALEKSANDER NOWAKOWSKI, a subject of the Czar of Russia, resident of Detroit, county of Wayne, and State of Michigan, have invented certain new and useful Improvements in Spittoons, of which the following is a specification.

This invention relates to improvements in spittoons, and particularly those of a semiportable nature.

The principal object of the invention is to provide a spittoon or cuspidor in which the fluids are readily separated from the solids so that the repulsive appearance so often encountered in ordinary cuspidors is obviated, the device being readily movable from place to place as may be desired.

These and other objects are attained by the novel construction and combination of parts hereafter described and shown in the accompanying drawings, forming a material part of this disclosure, and in which:—

Figure 1 is a perspective view of a cuspidor made in accordance with the invention.

Fig. 2 is an enlarged vertical sectional view taken substantially through the center of the same.

The invention comprises a relatively rigid vessel, having conical side walls 10 and an integrally formed bottom member 11, to which are secured a plurality of casters 12, so as to enable the apparatus to be readily moved from place to place.

The upper part of the apparatus is formed with a flaring dish-like element 15, terminating at its upper edge in a bead 16 at opposite points of which are ears 17, by which the bail or handle 18 may be secured.

The adjoining portion 20 of the vessel is also formed conically but at a different angle, and is open at the bottom, which is reinforced with a band 21, used to secure a netting 22 of a woven wire fabric forming a cone shaped receptacle, terminating at its lower edge in a beaded member 23, to which is attached by the hinge 24 the bottom cover element 25, the same being circular and provided at the edge opposite the hinge 24 with a spring clip 26 engageable with the beaded rim 23 formed with the band 27, the material of the plate 25 being also of open meshed metallic netting similar to the cone 22.

Secured to the cone 20 near its junction with the dish 15 is a flat annular disk 30, the downturned edge 31 of which is provided at spaced intervals with hooks 32 adapted to engage with raised projections 33, formed in the support vessel 10 near its upper edge, so that the two vessels may be firmly clamped together.

In operation, the device being assembled as indicated in Figs. 1 and 2, it may be placed where most desired, the vessels filled with water to a level indicated by the line X—X the same being nearly to the junction of the reinforcing band 21. Therefore, any matter which enters the top of the cuspidor will drop into the receptacle 22 on the bottom 25 and into a relatively large body of water, disseminating odors, colors, and the like in a satisfactory manner, while any sedimentation or solid portions are received upon the cover 25 and there maintained until the vessel be removed by releasing the clips 32, rendering the operation of cleansing the apparatus unusually easy.

It will be obvious that the contents of the outer vessel 10 may be readily removed by inverting the vessel, and it will be equally evident that any of the solid contents resting upon the hinged bottom plate 25 may be removed by releasing the clip 26, whereupon the cover swings outwardly, in the manner of a door, permitting full and entire access to the interior of the vessel, thereby providing a sanitary device of the type mentioned.

Having thus described my invention, what I claim as new, and desire to secure by Letters Patent, is:—

1. The combination with a support vessel having annular walls and an imperforate bottom, of an interior vessel adapted to rest upon the upper walls of said support vessel, means for engaging said interior vessel thereto, a meshed conical netting secured to the lower open edges of said interior vessel, a meshed cover hingedly secured to the lower edge of said meshed cone, means for holding said cover in engagement, and means for raising said interior vessel from said support vessel.

2. In a device of the class described, the combination with a hollow inverted conical vessel having an imperforate base and a plurality of casters engaged therewith, of a conical vessel adapted to be engaged within said inverted vessel, an annular flange formed exteriorly of said conical vessel, means combined with said flange whereby it may be removably engaged with said inverted conical vessel, a netted extension rigidly secured to the open edge of said inner vessel, a reinforcing band at the bottom of said netted extension, a frame hinged to said reinforcement, said frame containing a meshed netting, means for securing said frame in operative position, and means for raising said inner vessel from said support vessel.

In testimony whereof I have affixed my signature.

ALEKSANDER NOWAKOWSKI.

Copies of this patent may be obtained for five cents each, by addressing the "Commissioner of Patents, Washington, D. C."